United States Patent
Qiu et al.

(10) Patent No.: US 6,309,717 B1
(45) Date of Patent: Oct. 30, 2001

(54) COMPOSITE PAPERBOARD CONTAINERS OF OPTIMIZED AXIAL STRENGTH CONSTRUCTION

(75) Inventors: Yanping Qiu, Middleton, WI (US); Patrick Trevanion, Yorkshire (GB); Yiming Wang, Middleton; Terry D. Gerhardt, Madison, both of WI (US); Glenda Cahill; Richard Skiff, both of Florence, SC (US)

(73) Assignee: Sonoco Development, Inc., Hartsville, SC (US)

(*) Notice: Subject to any disclaimer, the term of this patent is extended or adjusted under 35 U.S.C. 154(b) by 0 days.

(21) Appl. No.: 09/179,323

(22) Filed: Oct. 27, 1998

(51) Int. Cl.⁷ ................................ F16L 9/16; B32B 9/06
(52) U.S. Cl. .................. 428/34.2; 428/34.3; 428/36.91; 428/218; 428/537.5; 138/141; 138/144; 242/118; 242/118.32; 242/118.8; 242/610.1
(58) Field of Search .................... 428/34.2, 34.3, 428/36.91, 218, 537.5; 138/144, 141, 140, 150, 154; 242/118, 118.32, 118.8, 610.1

(56) References Cited

U.S. PATENT DOCUMENTS

| | | |
|---|---|---|
| 3,548,883 * | 12/1970 | Cohen ................................. 138/144 |
| 3,687,351 | 8/1972 | Kaercher et al. . |
| 3,783,908 * | 1/1974 | Stump et al. ........................ 138/144 |
| 4,645,553 * | 2/1987 | Languillat ........................... 138/144 |
| 4,792,326 * | 12/1988 | Tews ................................... 138/144 |
| 5,393,582 | 2/1995 | Wang et al. . |
| 5,505,395 | 4/1996 | Qiu et al. . |
| 5,846,619 * | 12/1998 | Cahill et al. ........................ 428/34.2 |

FOREIGN PATENT DOCUMENTS

| | | |
|---|---|---|
| 0 631 963 | 1/1995 | (EP) . |
| 1190961 | 5/1970 | (GB) . |

* cited by examiner

Primary Examiner—Rena L. Dye
(74) Attorney, Agent, or Firm—Alston & Bird LLP

(57) ABSTRACT

Composite paperboard container constructions, providing optimized axial crush strength, and related properties, are formed of one, two, or three structural paperboard plies that are arranged to form a layered body wall having a cross-section of the construction in the ordered structure, high compression strength paperboard layer\low compression strength paperboard layer\high compression strength paperboard layer. Preferably, the container body is formed of one or two structural plies and at least one structural ply is a multiple layer paperboard having both high compression strength and low compression strength paperboard layers.

23 Claims, 2 Drawing Sheets

COMPOSITE PAPERBOARD CONTAINERS OF OPTIMIZED AXIAL STRENGTH CONSTRUCTION

FIELD OF THE INVENTION

The invention is directed to composite paperboard containers and container bodies for products such as foodstuffs and other commodities. More specifically, the invention relates to composite paperboard containers and container bodies having a body wall construction that optimizes axial strength, stiffness and related properties as compared to conventional container body constructions from comparable materials.

BACKGROUND OF THE INVENTION

Composite paperboard containers for packaging foodstuffs and various other commodities constitute commercially significant products. These containers are well known to consumers as packaging for various foodstuffs including frozen drinks, ready to eat snack products, powdered beverages, nuts, dough products, and various non-food products including adhesives, sealants, etc. Typically, the containers are formed of a single ply or multiple ply paperboard body wall; an interior liner formed of one or more layers to protect the contents of the container from moisture and/or oxygen; and an exterior label layer identifying the contents of the container. End cap or closure members are attached to one or both ends of the container body and are typically formed of metal, plastics, films or film laminates, or composite paperboard materials. In some cases, one end of the container can be formed of a peelable film layer covered by a protective cap.

In many cases the container bodies have a circular or round cross-section, see for example, U.S. Pat. No. 3,892,351 to Johnson et al. However the container bodies can alternatively have a non-round cross-section, see for example U.S. Pat. No. Des. 382,446 to Bacon.

The composite container bodies are produced by various processes including the spiral winding, convolute winding, and linear draw processes which are conducted by wrapping or winding a structural paperboard body wall ply or plies, and a liner ply and/or label ply around a stationary mandrel to form a continuous tubular body. The tubular body is cut into segments, each having the desired length for a single container. Subsequently, a closure member is applied to one end of each container body to thereby provide an open container that can be filled with the desired product. After the container is filled with product, the second closure member is applied to seal the open end of the container.

The process of applying the closure members to the container ends typically involves the application of considerable axial force to the container body. In some cases, a rolled lip is formed on one end of the container body in order to provide a sealable surface for a peelable film layer and/or to support a snap-on overcap. The operation to form such a rolled lip similarly involves the application of considerable axial load to the container body. In addition, the filled containers are often subjected to considerable axial load during shipping and storage because multiple layers of packaged product may be stacked on top of each other during shipping and storage and/or multiple cartons of the filled containers may be stacked on top of each other or provide support for cartons of other products.

Because of such axially applied forces that the composite paperboard container bodies must withstand during manufacture, transportation and storage, the strength and thickness of the single ply or multiple ply paperboard material forming the body wall is selected to provide the necessary axial crush strength. This is typically achieved by using relatively high compression strength paperboard to form the single or multiple body wall plies and/or by selecting the thickness of the ply or plies to provide a specific body wall thickness calculated to meet structural requirements. Typically, the paperboard materials have a normalized compression strength, i.e, strength per unit area measured in the machine direction according to the standard "STFI" TAPPI procedure, of greater than about 1800 psi (pounds per square inch, 1 psi=6895Pa, 1Pa=N/m$^2$) and typically the paperboard portion of the body wall has a thickness greater than about 0.014 inch.

Recently, different improved constructions of multiple layer paperboard winding cores for wound products such as films, yarns, and the like, have been disclosed. The different constructions each provide specific enhanced strength properties, tailored for the end use of the winding core. For example, U.S. Pat. No. 5,505,395 to Qiu et al. discloses spirally wound paperboard winding cores having enhanced resistance to inside diameter reduction resulting from the radially applied pressure of a tightly wrapped film or yarn material. In these constructions, the cylindrical body wall of the winding core is formed from three or more structural paperboard layers. The middle paperboard layer or layers used to form the body wall is formed of a low strength, low density paperboard material while the paperboard layers forming the outside and inside portions of the winding core are formed of higher strength, high density paperboard materials. On the other hand, U.S. Pat. No. 5,393,582 to Wang et al. discloses that paperboard tubes of enhanced flat crush strength may be formed from three or more plies of paperboard materials arranged to provide high compression strength paperboard materials as the middle or central portion of the body wall and low density, low strength paperboard materials at the outside and interior portions of the walls of the paperboard tube.

In winding core constructions, such as those discussed above, the axial strength of the tubes is not generally a design parameter because winding core constructions normally provide an axial strength exceeding the requirements imposed by that end use. In general, this results from a relatively high wall thickness, the use of many paperboard plies, and/or from the relatively high strength of the paperboard materials used to form winding cores.

Although the strength properties of composite paperboard container bodies can likewise be enhanced by forming the paperboard bodies of many paperboard plies, by using high strength paperboard materials, and/or by increasing body wall thickness, these modifications significantly increase the cost of the container bodies particularly in view of the liner and label plies that must be applied to the single ply or multiple ply paperboard body during the container body forming process. Accordingly, as a practical matter, the paperboard body construction techniques to enhance axial crush strength, currently available to those skilled in the art, involve use of paperboards of increased strength, and/or increasing body wall thickness, and/or the choice of one, two, or three paperboard plies as the body wall materials.

SUMMARY OF THE INVENTION

The invention provides composite paperboard container constructions providing optimized axial crush strength, side wall stiffness, implosion resistance and related properties. The optimized axial crush strength, composite paperboard container constructions of the invention provide axial crush strength properties comparable to, or exceeding the axial crush strength properties of conventional container body constructions with decreased reliance on high strength paperboard materials, and/or on total quantity of paperboard materials. In particular, the container body constructions of the invention have comparable or increased axial strength properties as compared to conventional paperboard container constructions; nevertheless, they can be prepared from paperboard materials having a lower overall furnish (paperboard pulp) content per container, and/or from environmentally desirable furnishes having a higher content of low strength materials such as recycled newsprint.

In accordance with the invention, composite paperboard container bodies are formed of one, two, or three structural paperboard plies that are arranged to form a layered body wall having a cross-section of the ordered construction; high strength paperboard layer\low strength paperboard layer\high strength paperboard layer. Preferably, the container body is formed of one or two structural plies and in which at least one structural ply is a multiple layer paperboard having both high strength and low strength paperboard layers. The terms, "strength", "compression strength", and "STFI strength" as applied to paperboard layers and plies, are used herein to mean normalized compression strength, measured in the machine direction (MD), only, of the paperboard, using the TAPPI standard testing procedure "Short span compressive strength of containerboard; T 826 pm-92 (1992)", known in the industry as the "STFI" test. On the other hand, "axial strength" of container bodies constructed according to the present invention is determined according to Composite Can and Tube Institute (CCTI) Standard Testing Procedure CT-107 (September 1984).

The term "ply" is used herein to refer to a paperboard sheet, including wide and narrow sheets, which is wound or wrapped onto a mandrel, or onto another container body ply on the mandrel, to form the body wall of a container. The body wall can be formed from a single ply or multiple plies. The terms "layer" and "paperboard layer" when applied to a ply or to a paperboard sheet, are used herein to refer to a portion of the thickness of the ply or paperboard sheet. In common terminology, a layer of a paperboard sheet is also called a paper layer, and for purposes of the present application, the term paperboard layer also applies to such a "paper" layer of a paperboard sheet. On the other hand, the term "layer" when used with reference to a composite container body or bodywall, in the present application, can refer either to a ply or to a paperboard layer.

The composite paperboard container bodies of the invention have a total wall thickness and an axial strength comparable to conventional composite container bodies. Thus the total wall thickness is about 0.060 in. (60 mils or 60 point) or less, normally about 0.050 in. or less, and the axial crush strength of the container body is 100 lbs or greater. This is in contrast to a core or tube used for winding thereon products such as films, yarns and the like wherein from 5 to 35 plies are normally used resulting in a body wall thickness of from 0.150 in. to 0.900 in. In accordance with the invention, it has been found that high strength paperboard layers positioned on the outside and on the inside of the container body wall contribute substantially to the overall axial strength of the container even when the high strength paperboard layers form only a minor portion, for example 10%, of the total body wall thickness.

In preferred embodiments of the invention, at least one structural paperboard ply is a multiple layer paperboard ply having both high strength and low strength paperboard layers. Container constructions including one or more multi-layer paperboard plies having both high strength and low strength layers, allow for the use of extremely thin, high strength paperboard layers without substantially increasing the complexity of container manufacturing operations. In one such preferred embodiment, the container body wall is formed from a single structural paperboard ply having the three layer construction: high strength paperboard layer/low strength paperboard layer/high strength paperboard layer. In another preferred embodiment of the invention, the container body wall is formed from two structural paperboard plies, each ply having a two layer paperboard construction of the structure: high strength paperboard layer/low strength paperboard layer. In the latter construction, the two paperboard plies are positioned with the low strength layers in face-to-face contact so that the low strength paperboard layers combine to form a single centrally positioned low strength paperboard layer of the body wall while the high strength layers form the outer and inner layers of the body wall.

The multiple layer paperboard ply or plies used to prepare container bodies in accordance with preferred embodiments of the invention can be readily formed without significant modification or disruption of the conventional paperboard manufacturing process. In particular, paperboard materials or plies, because of their substantial thickness, are often formed by superimposing and consolidating a plurality of thinner layers. Typically, the multiple layers are prepared in series using a plurality of papermaking operations. In the conventional process, the furnish used to form each layer has the same composition, although sometimes different furnishes are used for cosmetic purposes such as for the formation of a smooth, printable surface. In the present invention, paperboard layers of different strengths are consolidated to significantly modify the structural properties of the final composite paperboard ply and can readily be prepared by employing different papermaking furnishes in selected layers of the multiple papermaking operations used to form the multi-layer paperboard ply or sheet.

As well known to those skilled in the art, the composition of the papermaking furnish used to form a particular paperboard strongly influences the final compression strength of the paperboard. As a result, certain pulps or furnishes are normally considered unsuitable for the formation of paperboards having strengths conventionally believed necessary to form the relatively thin walls, i.e. less than about 0.06 inch, of container bodies of high axial strength. For example, a 100% recycled newsprint furnish forms a low compression strength paperboard and is accordingly not normally used in the manufacture of container bodies unless the wall is sufficiently thick to provide a strength corresponding to a body made with high strength paperboard. The present invention allows the use of greater amounts of low strength paperboard, based e.g., on recycled newsprint, in the manufacture of composite container bodies.

The body walls of the composite paperboard container bodies of the invention typically include a low strength paperboard layer constituting 25% or more of the total body wall thickness. In preferred embodiments of the invention, the low strength paperboard materials used to form the low strength layer constitute about 50% by weight or more of the composition of the body wall of the container, up to as much as 50% of the composition of the body wall of the container, preferably 75 to 90%. Thus, the greatest majority of the body wall can be formed of various furnishes such as those based on low grade recycled materials that would be conventionally considered undesirable for container body manufacture.

In the case of container bodies formed from two or more plies which are each single layer, i.e., single furnish, paperboard plies, it is preferred that the difference in strength between the high compression strength and the lower compression strength paperboard plies is at least about 10%, more preferably, at least about 15%, based on the strength of the lower strength paperboard ply. However, in the preferred embodiments of the invention which employ at least one multi-layer paperboard ply having layers of different strengths, it is not possible as a practical matter, to measure the separate compression strengths of individual paperboard layers. This is particularly true when one or both of the high strength paperboard layers is an extremely thin layer, e.g. from about 1 mil (0.001 inch) to about 5 mils (0.005 inch) in thickness, as in highly preferred embodiments of the invention. In such cases, the strength of the high strength paperboard layer or layers in the composite sheet is not measured directly. Instead, the compression strength of the composite paperboard sheet is compared to the compression strength of the low strength paperboard layer (which is measured after removing the high strength paperboard layer or layers by gentle grinding). In the case of a two layer (high strength, low strength) composite paperboard ply or sheet, the composite sheet preferably has a compression strength at least about 20% greater, more preferably at least 30% greater, than the strength of the low strength layer. In the case of a three layer composite paperboard ply or sheet (high strength, low strength, high strength) the composite sheet preferably has a strength at least about 20% greater, preferably 30% greater, than the low strength paperboard layer.

In various preferred embodiments of the invention, the composite paperboard container bodies also include an outside label ply for identifying a product associated with the container body. The container bodies also typically include an interior liner ply having moisture and/or oxygen barrier or other protective properties. The label and liner plies can be integrally formed on a surface of the ply or plies forming the body wall, if desired.

The composite paperboard container bodies of the invention can be prepared from a wide range of grades of papermaking materials and in particular, allow the manufacture of optimized axial crush strength container bodies based in substantial part on low grade paper-making furnishes that were previously considered by those of ordinary skill in the art, as unsuitable for use in making high axial crush strength container bodies. Accordingly, the container bodies of the invention allow decreased reliance on natural resource-intensive papermaking furnishes while allowing greater use of low grade recycled materials. The composite paperboard container bodies of the invention also increase the flexibility of the manufacturing process by providing a choice among different grades of papermaking materials for achieving an axial crush strength in the final composite paperboard container body that meets a customer's specifications.

BRIEF DESCRIPTION OF THE DRAWINGS

In the drawings which form a portion of the original disclosure of the invention.

DETAILED DESCRIPTION OF THE INVENTION

In the following detailed description, various preferred embodiments of the invention are described. It will be understood, however, that the invention is not to be limited to its preferred embodiments. But to the contrary, the invention includes various alternatives and modifications as will be apparent to the skilled artisan from a consideration of the foregoing and following detailed description of preferred embodiments of the invention.

Figure 1:
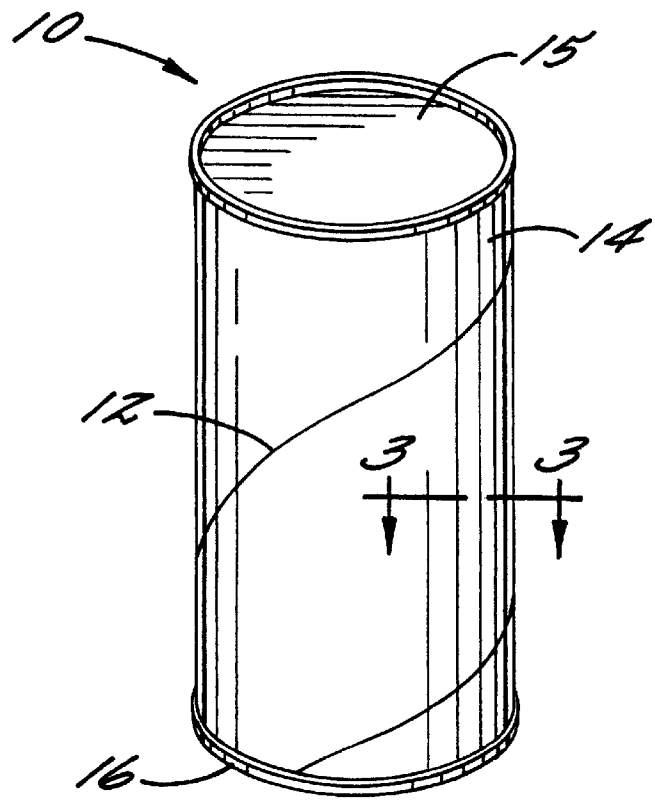
FIG. 1 is a perspective view of a cylindrical, composite paperboard container according to one preferred embodiment of the invention.
Figure 2:
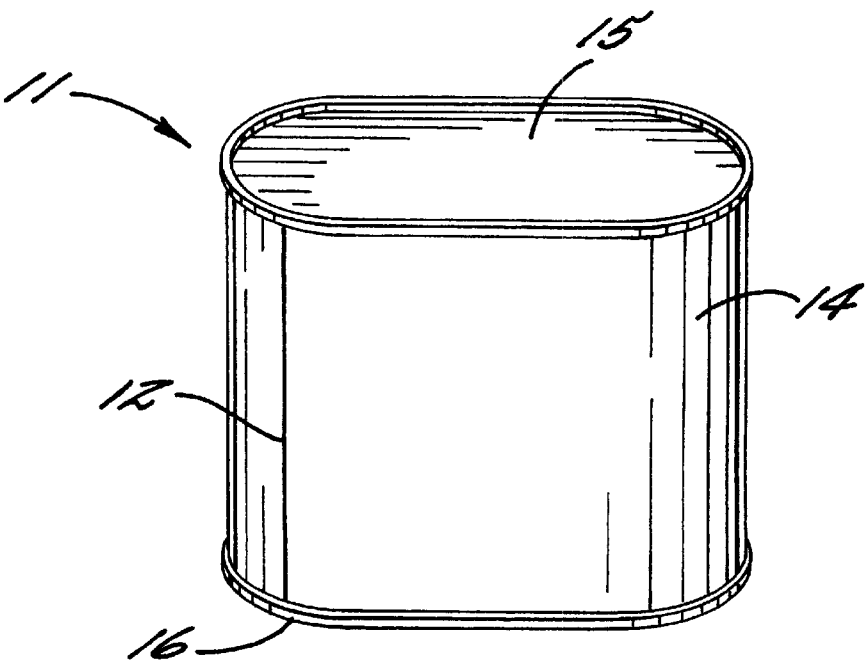
FIG. 2 is a perspective view of a different composite paperboard container according to another preferred embodiment of the invention.

FIGS. 1 and 2 illustrate perspective views of preferred composite paperboard containers 10 and 11 according to the invention. The container 10 is a substantially cylindrical container having a spirally orientated seam 12 visible on the outer label ply 14. The container 11 of FIG. 2 has a generally elliptical or oval cross-section and includes an outer label ply 14 having a visible seam 12 that is oriented parallel to the axis of the container 11. The container 10 of FIG. 1 is formed by the well known spiral winding process whereas the container 11 of FIG. 2 is prepared by the linear draw process, also well known to those of ordinary skill in the art. The container bodies of the containers 10 and 11 of FIG. 1 and FIG. 2 can alternatively be formed in accord with the invention using a convolute winding process which is also well known to those of ordinary skill in the art. Moreover, the container body of the container 10 of FIG. 1 can be formed using a linear draw process, and the container body of FIG. 2 can be formed using a spiral winding process.

Each of the containers 10 and 11, as shown in FIGS. 1 and 2 respectively, include a top end closure member 15 and a bottom end closure member 16 attached to the respective top and bottoms of the respective containers. Although metal, end-seamed, closure members are illustrated in FIGS. 1 and 2, various different end-closure members can be employed in containers of the invention including film, foil, paperboard, and laminated composite closure members. Exemplary paperboard bottom closure members disclosed and illustrated in U.S. Pat. No. 5,431,619 to Bacon issued Jul. 11, 1995, the disclosure of which is hereby incorporated in its entirety by reference. Similarly, peelable heat-sealed film, foil, paperboard and laminated closures, and/or snap-on overcap closures can be employed as a closure member, as disclosed, for example, in the aforementioned Bacon patent, and/or in U.S. Pat. No. 3,892,351 to Johnson and in U.S. Des. Pat. No. 382,446 to Bacon, the disclosures of which are incorporated herein by reference in their entirety.

Figure 3:
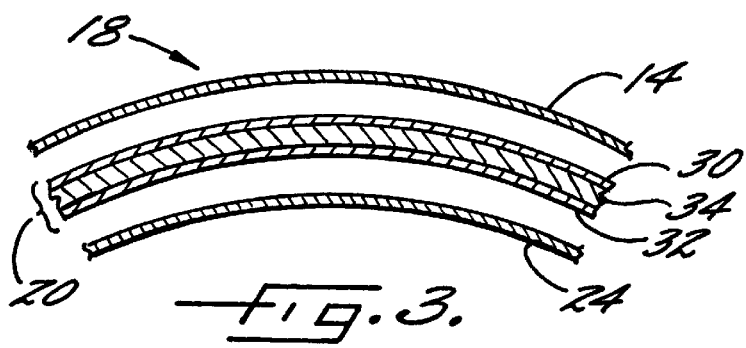
FIG. 3 is a greatly enlarged, exploded, fragmentary sectional view taken along line 3—3 of FIG. 1 and illustrates one preferred container body construction according to the invention in which a single, three-layer structural paperboard ply forms the body wall of the container.

Preferred alternative constructions for the body wall of containers 10 and 11 are illustrated in FIGS. 3, 4, 5 and 6. In the embodiment of FIG. 3, the container body wall 18 is formed of a single, three-layer, structural paperboard ply 20 which is positioned between an exterior label ply 14 and an interior liner ply 24. The liner ply 24 is traditionally employed to provide barrier properties and/or heat seal properties to the container body inside surface and can be formed from a single layer sheet material such as a polymeric film or a metallic foil, or from a multiple layer sheet material such as a film/foil, film/paper layer, or foil/paper structure. The exterior label ply 14 typically includes an outer printed surface in order to provide information as to the contents of the container 10. For the purposes of the present invention, such exterior and interior label and liner plies 14, 24, respectively, which are provided for specific non-strength (axial) imparting purposes, and which do not individually increase the axial strength of the container body by an amount of about 10% or more, are considered to be non-structural portions of the body wall 18.

In some instances, the liner ply function and/or the label ply function can be achieved by the structural body wall layer or layers, as for example when functional barrier materials are deposited directly on the interior surface of the structural ply 20, or when a printing layer is provided on the outer surface of the structural ply 20. In such instances, the label and/or liner ply functions are achieved directly by the structural paperboard ply, and such structural paperboard plies having modified interior and/or exterior surfaces to provide such additional functions are intended to be included within the scope of the term, structural paperboard ply, as used herein.

Returning now to FIG. 3, it will be seen that the structural paperboard ply 20 is formed of three separate layers, including an outer layer 30, and an interior layer 32. A central layer 34 is sandwiched between the outer layer 30 and the interior layer 32. In accordance with the invention, the central layer 34 is formed of a low compression strength paperboard material. Each of the exterior and interior layers 30 and 32 are formed of a higher compression strength paperboard material. Preferably the outer and interior layers 30 and 32, respectively, have a strength sufficient to increase the STFI normalized compression strength of the structural paperboard ply 20 so that it is at least about 20%, more preferably at least about 30%, higher than that of the central layer 34. The strength of the two higher strength layers 30 and 32 is preferably the same, however, the strength of the two high-strength layers 30, 32 can vary from layer to layer so long as each high strength layer is formed of a high strength paperboard furnish and the composite paperboard sheet or ply 20 has a strength at least 20% greater than the strength of the central layer 34 (based on the strength of the central layer).

Paperboard compression strengths are determined for the purposes of the subject invention in accordance with the TAPPI "STFI" standard test, modified however in that in the case of a multi-layer, multi-composition, composite paperboard, the test is applied to the low compression strength layer of a composite paperboard sheet, e.g., to the central portion of a three layer ply, or to the low strength layer of a two layer composite paperboard sheet; or ply and the test is also applied to the composite paperboard sheet. For example, in the case of the multi-layer high strength/low strength/high strength composite paperboard sheet or ply shown in FIG. 3, the test is applied to the composite sheet 20 and to the middle layer 34.

As indicated previously, in the case of multi-layer composite paperboard sheets, or plies the low compression strength portion of the paperboard sheet is typically of greater thickness than the high compression strength portion of the paperboard sheet and is accordingly more readily tested for compression strength. The compression strength of the low strength portion of the paperboard sheet can be determined by separating (by a very gentle rotary sanding or grinding operation using a very fine grit abrasive wheel or by an equivalent cutting/peeling operation) the high strength layer or layers of the paperboard sheet so as to completely remove the high strength layer or layers from a suitable test strip. Thereafter, the compression strength of the low strength layer can readily be determined. Because the STFI compression strength measurement is a "normalized" measurement which measures strength per unit area of cross-section (transverse to the sheet), small variations in the thickness of the low strength paperboard layer as compared to the original thickness of this layer in the composite sheet (up to 5 to 10% of the original thickness) are relatively unimportant so long as the thickness is uniform along the sample being tested. In addition, it is relatively easy to determine the boundary between the high strength paperboard layer and the low strength paperboard layer or layers because, as generally known to those skilled in the art, the coloring of high strength paperboard materials is generally different than the coloring of low strength paperboard materials due to the differences in the composition of the furnishes used to form high strength and low strength paperboard materials. At any rate, even when the variations in coloring are not readily apparent, the differences in the pulp materials are readily apparent upon microscopic examination of the cross-section of the composite sheet so that it is a relatively straight forward matter to determine when all of the high strength paperboard layer has been removed from the low strength paperboard layer.

Paperboard strips or plies of a widely varying range of strengths and thicknesses are used to form paperboard composite containers as is well known in the art. The present invention can employ paperboard materials in the high compression strength layers 30 and 32 of ply 20 having strengths throughout the range of strengths normally used in the art. Typically the high compression strength paperboard layers used to form composite container bodywall in accord with the invention, have strengths or a strength contribution from about 2,300 to 6,000 psi more typically from about 2,600 to 5,000 psi. The low compression strength paperboard layer 34 of ply 20 can be formed from paperboard materials having a strength range including strengths below the strength of paperboard materials typically used in the art to form container bodies. Typically the low compression strength paperboard layer will have a strength ranging from about 1,200 to 3,400 psi, more typically from about 2,000 to 2,800 psi. As is apparent from the above, the low compression strength paperboard layer can in some cases have a strength within the range of high compression strength paperboard materials, as set forth above. In such instances, the higher strength paperboard layers 30 and 32 of ply 20, have even a higher strength (typically still within the strength ranges set forth above) as will be apparent.

As indicated previously, the high compression strength layers 30 and 32 preferably have a strength difference as compared to the low compression strength 34 layer such that the strength of the composite sheet 20 is at least 20% greater, more preferably at least 30% greater, than the strength of the low strength layer 34 alone. This difference is determined by subtracting the STFI strength the lower strength paperboard layer 34 from the STFI strength of the composite paperboard sheet 20 and then expressing the difference as a percentage of the strength of the lower strength paperboard layer 34.

Figure 4:
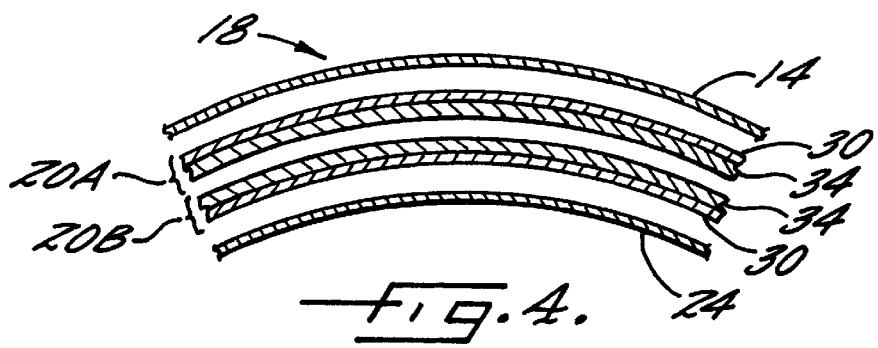
FIG. 4 is a greatly enlarged, exploded, fragmentary sectional view of an alternative container body wall construction according to the invention in which two identical structural paperboard plies, each having two layers, are used to form the a container body wall.
Figure 5:
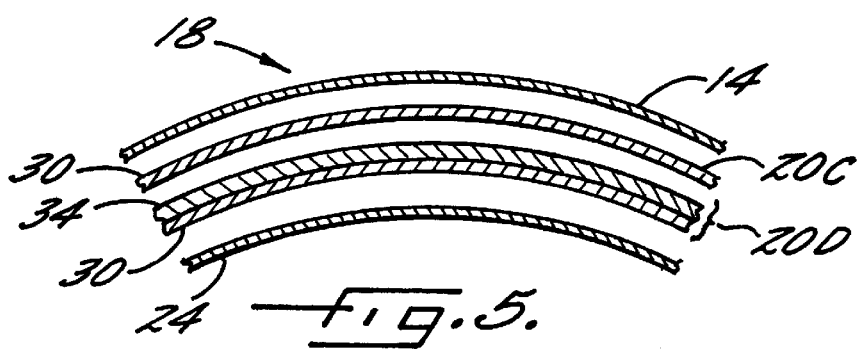
FIG. 5 is a greatly enlarged, exploded, fragmentary sectional view of a third alternative container body wall construction according to the invention wherein the container body wall is formed from two structural paperboard plies, with one of the paperboard plies formed of a single layer formed from an single papermaking furnish composition, and the other paperboard ply having a two-layer, i.e. high strength layer/low strength layer construction.

FIGS. 4 and 5 illustrate container body wall 18 constructions according to the present invention in which two structural paperboard plies are used to form the container body wall. In FIG. 4, two structural paperboard plies 20A and 20B of like construction are used to form the body wall 18 of the container. Each of the paperboard plies 20A and 20B are formed of two layers 30 and 34, representing high compression strength and low compression strength paperboard layers, respectively. As discussed previously, the high compression strength layers 30 have a difference in strength from that of and low compression strength paperboard layers 34, such that the STFI strength of each composite paperboard sheet or ply, 20A and 20B, exceeds that of the corresponding low strength layer of the ply 34 by at least about 20%, preferably 30%, based on the strength of the low strength layer 34. The body wall 18 construction illustrated in FIG. 4 also includes an exterior label ply 14 and an interior liner ply 24 like the body wall 18 construction illustrated in FIG. 3.

As also seen in FIG. 4, the two low strength paperboard layers 34 are arranged in contacting face-to-face relationship in the body wall 18. In such arrangement, the two low strength paperboard layers 34 combine in the final body wall 18 to form a single central paperboard layer as will be apparent.

The container body wall 18 construction illustrated in FIG. 5 is formed of two structural paperboard plies 20C and 20D. In this construction, one of the structural paperboard plies, 20C, is a single layer paperboard ply of uniform strength and of uniform furnish composition throughout its cross-section. The other paperboard ply, 20D, is a two-layer paperboard ply formed of a high compression strength layer 30 and a lower strength layer 34. The single layer paperboard ply, 20C is formed entirely of higher strength paperboard material. As illustrated in FIG. 5, the lower strength paperboard layer 34 of paperboard ply 20D is sandwiched between the higher strength paperboard layer 30 of paperboard ply 20D and the single layer, high compression strength paperboard ply 20C. Although FIG. 5 illustrates the two layer paperboard ply 20D as the interior bodywall structural ply, the ply 20D could alternatively form the exterior structural ply and ply 20C could form the interior structural ply as will be apparent. The compression strength of composite ply or sheet 20D is preferably at least 20% greater than the compression strength of the low strength layer 34 thereof. In addition, the compression strength of the single layer high strength ply 20C, is preferably at least about 20% greater than the compression strength of the low strength layer 34 of multi-layer sheet 20D.

Figure 6:
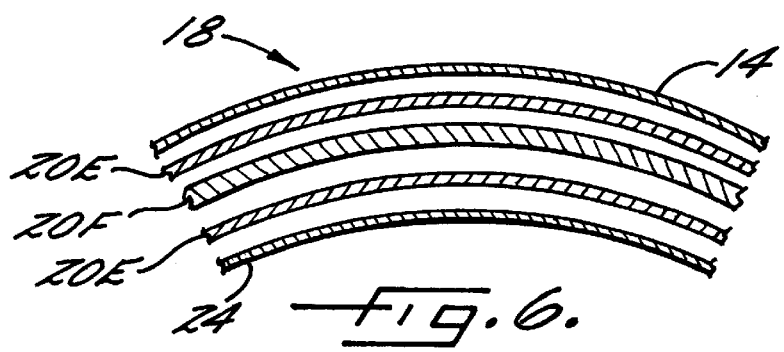
FIG. 6 is a greatly enlarged, exploded, fragmentary sectional view of a third alternative body wall construction according to the invention wherein the container body wall is formed from three structural paperboard plies, with each of the paperboard plies being formed of a single layer formed from a single papermaking furnish; the outside and inside plies being formed of a high strength furnish, and the central ply being formed from a low strength furnish.

The container body wall construction illustrated in FIG. 6 is formed of three structural paperboard plies 20E, 20F, and 20E. In this construction, the interior and exterior paperboard plies 20E a single layer are each of uniform strength and uniform furnish composition throughout their cross-sections. Similarly, the central paperboard ply 20F, is of a single layer uniform strength and uniform furnish composition across its cross-section. The STFI compression strength of each of the outer and interior layers 20E, exceeds the STFI compression strength of the central paperboard ply 20F by at least about 10%, based on the strength of the central paperboard ply 20F.

The container body 18 constructions of the present invention provide container bodies having an axial crush strength which is the same or comparable to container bodies having a body wall of slightly smaller thickness formed entirely of the same higher compression strength, paperboard materials used in the higher strength layers of the multi-layer paperboard plies employed in the present invention. In accord with the present invention, it has been found that axial crush strength properties of container body walls formed of a single paperboard ply or from two paperboard plies, can be determined primarily by the strength of the outside and inside portions of the body wall when the body wall is properly constructed. Accordingly, the substitution of a low compression strength, paperboard material for the middle or central portion of the body wall, particularly when accompanied by a small increase in bodywall thickness, does not detract materially from the overall axial crush strength of the container body.

In the various preferred embodiments of the invention illustrated in FIGS. 3–6, the high compression strength paperboard layers will typically form from about 5% to about 50%, preferably about 5% to about 25%, more preferably about 10% to about 20% of the total thickness of the container body wall. The exact ratio between the thickness of high compression strength and the thickness of the low compression strength paperboard layers can be varied depending on the total body wall thickness and strength requirements. In general, the structural paperboard ply or plies forming the container body wall will have a total combined thickness of between about 0.014 in. (14 mil) and about 0.060 in. (60 mil), more preferably between about 0.016 in. (16 mil) and about 0.045 in (45 mil). In highly preferred embodiments, the total body wall thickness is constructed such that it exceeds the normal total body wall thickness of a conventional single ply container body wall made of high compression strength paperboard in which the container has a comparable axial crush strength. In order to achieve the most efficient use of the high compression strength paperboard materials, it is preferred that the total thickness of the low compression strength paperboard materials exceeds 50% of the total body wall thickness. Although the exterior and interior high compression strength paperboard layers are preferably of about the same thickness with respect to each other, these layers can have thicknesses different from one another within the scope of the invention, as will be apparent.

As indicated previously, the multiple layer paperboard ply or plies used to prepare container bodies of the invention can be formed without significant modification or disruption of conventional paperboard manufacturing processes. This is because paperboard materials, due to their increased thicknesses as compared to paper, are often formed by superimposing and consolidating a plurality of layers. In the conventional process, the multiple layers are prepared using the same papermaking furnish in a plurality of papermaking operations. The multiple strength paperboard plies employed in the present invention can readily be prepared by employing different grades of papermaking furnish with different ones of the papermaking operations being used to form the different layers of the paperboard sheet material illustrated in FIGS. 3–6.

The manufacture of container bodies of optimized axial crush strength construction according to the invention similarly can be accomplished without substantial modification to conventional container manufacturing processes. As indicated previously, the container body constructions according to the present invention may be formed using various well known spiral winding, linear draw and convolute winding processes as are well known to those skilled in the art. For example, spiral winding processes are illustrated in U.S. Pat. No. 5,393,582 issued to Yiming Wang et al. and U.S. Pat. No. 5,505,395 to Qiu et al. Similarly, linear draw processes are disclosed and illustrated in, for example, U.S. Pat. No. 3,122,305 to Young and in U.S. Pat. No. 3,656,513 to Evans. Convolute winding processes are disclosed in numerous patents including, for example, U.S. Pat. No. 3,506,183 to Turpin et al.

EXAMPLES

The following examples illustrate container body constructions according to the present invention and illustrate axial crush strength properties thereof as compared to conventional container constructions which are prepared relying entirely on high compression strength paperboard materials.

Multiple ply and single layer container bodies were prepared by a conventional spiral winding process from the paper materials set forth in Table 1 below. The low strength layer STFI strength test data shown for paperboard B in Table 1 was obtained by removing the outermost high strength layers by gentle grinding using a rotary abrasive wheel of very fine grit while the composite sheet was held by vacuum on a vacuum table. STFI strength was then measured from a test strip of the single layer sample thus obtained.

paperboard B is thinner than paperboard A, the axial compression strength of the corresponding container body is higher due to the two thin layers of strong compression strength paperboard on the top and bottom of the paperboard sheet which is otherwise made from the same furnish as paperboard A. Although paperboard B is composed mostly of low compression strength materials, by slightly increasing wall thickness, and introducing thin layers of high compression strength containers paper, the compression strength containers made with paperboard B have better axial crush compression strength than containers made with 100% strong compression strength paperboard (paperboard C).

The invention has been described in considerable detail with reference to its preferred embodiments. It will be apparent however, that various alternatives and modifications can be made without departing from the spirit and scope of the invention as described in the foregoing detailed specification and defined in the appended claims.

What is claimed is:

1. A composite paperboard container body comprising:
   one, two, or three structural paperboard plies, said plies being arranged to form a layered body wall having a cross-section including at least two high compression strength paperboard layers positioned in opposing interior and exterior relationship with respect to a central low compression strength paperboard layer;
   said composite paperboard container body having a total wall thickness of less than about 0.060 inch and an axial crush strength of about 100 pounds or greater.

TABLE 1

| Paperboard | Thickness of Ply | No. of Layers | Thickness of Layers | Basis Wt. Lbs/1000 ft$^2$ | Composition of Layers | Total Strength (STFI$_{md}$) psi | Strength of Low Strength Layer (STFI$_{md}$) psi |
|---|---|---|---|---|---|---|---|
| A | 22.5 mil | 1 | 22.5 mil | 70.05 | Furnish A | 2197 | Not Applicable |
| B | 21.4 mil | 3 | 1.8 mil/ 17.8 mil/ 1.8 mil | 69.02 | Furnish B/ Furnish A/ Furnish B | 2374 | 1757 |
| C | 19 mil | 1 | 7.25 mil/ 7.25 mil | 61.46 | Furnish B | 2634 | Not Applicable |

* 1 mil = 10$^{-3}$ in = 2.54 × 10$^{-3}$ cm
* 1 psi = 6895 pa = 6895 N/m$^2$
Furnish A: 50% medium grade recycled paper + 50% low grade recycled paper
Furnish B: 50% medium grade recycled paper + 50% high grade recycled paper Container bodies prepared from the paperboard materials listed in Table 1 above each had an ID of 4.0625 inches. The OD of each container body was varied depending upon the thickness of the container body. The body wall construction of each container body is set forth in Table 2 below. In addition, the axial strength of the container bodies is also set forth in Table 2.

TABLE 2

| Papergrade | Number of Plies | Can Height (in) | Can ID (in) | Axial Strength (lbs) |
|---|---|---|---|---|
| A | 1 | 6 | 4.0625 | 367 |
| B | 1 | 6 | 4.0625 | 392 |
| C | 1 | 6 | 4.0625 | 323 |

* 1 in = 2.54 cm
* lbs = 4.45 Newton

In Table 2, experimental data of axial compression strength is presented. The container bodies made from paperboard B are clearly stronger than the container bodies made from the other two single grade paperboards. Although 2. The composite paperboard container body according to claim 1 wherein said body wall is formed from a single structural paperboard ply having a three layer construction of the ordered structure:
   high strength paperboard layer/low strength paperboard layer/high strength paperboard layer.

3. The composite paperboard container body according to claim 1 in which said structural paperboard plies include at least one two-layer paperboard ply having the ordered structure:
   high strength paperboard layer/low strength paperboard layer.

4. The composite paperboard container body according to claim 3 in which said structural paperboard plies include two paperboard plies, each having two layers with the ordered structure:
   high strength paperboard layer/low strength paperboard layer.

5. The composite paperboard container body according to claim 3 in which said structural paperboard plies include a second paperboard ply wherein said second paperboard ply is a single layer high strength paperboard ply formed of a single papermaking furnish.

6. The composite paperboard container body according to claim 1 in which said structural paperboard plies include three structural paperboard plies and wherein each paperboard ply is a single layer made from a single papermaking furnish and wherein two of said plies are high strength paperboard plies and one of said plies is a low strength paperboard ply.

7. The composite paperboard container body according to claim 2 wherein the compression strength of said single paperboard ply is at least about 20% greater than compression strength of the central low strength paperboard layer, based on compression strength of the low strength paperboard layer.

8. The composite paperboard container body according to claim 7 wherein the compression strength of the single paperboard ply is at least about 30% greater than the compression strength of the central low strength paperboard layer.

9. The composite paperboard container body according to claim 3 wherein the compression strength of said two-layer paperboard ply exceeds the compression strength of the low strength paperboard layer thereof by at least about 20%, based on the compression strength of the low strength paperboard layer.

10. The composite paperboard container body according to claim 1 wherein one or more low strength paperboard layers centrally positioned with respect to said high strength paperboard layers constitute about 50% or greater of the total body wall thickness.

11. The composite paperboard container body according to claim 10 wherein the high strength paperboard layers constitute from about 5% to about 25% of the total thickness of the container body wall.

12. The composite paperboard container body according to claim 11 wherein the body wall has a thickness of between about 0.016 inch and about 0.045 inch.

13. The composite paperboard container body according to claim 11 wherein the high strength paperboard layers constitute from 10% to 20% of the total thickness of the container bodywall.

14. A composite paperboard container body comprising:
a body wall formed of a single structural paperboard ply or two superimposed structural paperboard plies wherein at least one structural paperboard ply is a composite paperboard ply formed of at least two paperboard layers of different compression strengths, and wherein said body wall has a total wall thickness of less than about 0.060 inch and an axial crush strength of about 100 pounds or greater;
wherein said ply or plies forming the body wall are arranged to comprise at least two high compression strength paperboard layers positioned respectively at exterior and interior portions of the container body wall, and one or more lower compression strength paperboard layers positioned in a central portion of the body wall between the high strength paperboard layers; and
wherein the strength of the high strength paperboard layers forming the outermost and innermost surfaces of the paperboard body wall are such that the compression strength of the composite paperboard ply exceeds the compression strength of the lower strength paperboard layer thereof by at least about 20%.

15. The composite paperboard container body according to claim 14 wherein said body wall is formed from a single structural paperboard ply having a three layer construction of the ordered structure:
high strength paperboard layer/low strength paperboard layer/high strength paperboard layer.

16. The composite paperboard container body according to claim 14 in which said structural paperboard ply or plies include at least one two-layer paperboard ply having the ordered structure:
high strength paperboard layer/low strength paperboard layer.

17. The composite paperboard container body according to claim 16 in which said structural paperboard ply or plies include two paperboard plies, each having two layers with the ordered structure:
high strength paperboard layer/low strength paperboard layer.

18. The composite paperboard container body according to claim 16 in which said structural paperboard ply or plies include a second paperboard ply wherein said second paperboard ply is a single layer high strength paperboard ply formed of a single papermaking furnish.

19. The composite paperboard container body according to claim 15 wherein the compression strength of said single paperboard ply is at least about 20% greater than the compression strength of the low density paperboard layer thereof, based on the compression strength of the low strength paperboard layer.

20. The composite paperboard container body according to claim 19 wherein the strength of the said single paperboard ply is at least about 30% greater than the compression strength of the central low strength paperboard layer.

21. The composite paperboard container body according to claim 14 wherein the low strength paperboard layer or layers constitutes about 50% or greater of the total body wall thickness.

22. The composite paperboard container body according to claim 21 wherein the high strength paperboard layers constitute from about 50% to about 25% of the total thickness of the container body wall.

23. The composite paperboard container body according to claim 22 wherein the body wall has a thickness of between about 0.016 inch and about 0.045 inch.

* * * * *

UNITED STATES PATENT AND TRADEMARK OFFICE
CERTIFICATE OF CORRECTION

PATENT NO. : 6,309,717 B1
DATED : October 30, 2001
INVENTOR(S) : Qiu et al.

It is certified that error appears in the above-identified patent and that said Letters Patent is hereby corrected as shown below:

<u>Column 14,</u>
Line 49, "50%" should read -- 5% --.

Signed and Sealed this

Twenty-sixth Day of March, 2002

Attest:

*Attesting Officer*

JAMES E. ROGAN
*Director of the United States Patent and Trademark Office*